United States Patent [19]
Hinrichs et al.

[11] Patent Number: 5,886,317
[45] Date of Patent: *Mar. 23, 1999

[54] PROCESS FOR ENGRAVING A STRUCTURE INTO THE SURFACE OF A WORK PIECE WITH A LASER

[75] Inventors: Hans-Helmut Hinrichs, Winsen/Aller; Jürgen Minke, Langenhagen; Günter Lange, Hanover; Jens Mommsen, Adelheidsdorf; Ludger Overmeyer, Letter/Seelze; Markus Obert, Hanover, all of Germany

[73] Assignee: Benecke-Kaliko AG, Germany

[*] Notice: This patent issued on a continued prosecution application filed under 37 CFR 1.53(d), and is subject to the twenty year patent term provisions of 35 U.S.C. 154(a)(2).

[21] Appl. No.: 596,273
[22] PCT Filed: Jul. 22, 1994
[86] PCT No.: PCT/EP94/02430
  § 371 Date: Apr. 25, 1996
  § 102(e) Date: Apr. 25, 1996
[87] PCT Pub. No.: WO95/04626
  PCT Pub. Date: Feb. 16, 1995

[30] Foreign Application Priority Data

Aug. 11, 1993 [DE] Germany ................ 4326874

[51] Int. Cl.⁶ .................................................. B23K 26/00
[52] U.S. Cl. ................ 219/121.69; 358/297; 219/121.62
[58] Field of Search ........................ 219/121.61, 121.62, 219/212.68, 121.69, 121.78, 121.8, 121.83, 121.85; 358/297, 299; 364/474.08

[56] References Cited

U.S. PATENT DOCUMENTS

| | | | |
|---|---|---|---|
| 3,396,401 | 8/1968 | Nonomura | 219/121.78 |
| 3,632,205 | 1/1972 | Marcy | 219/121.68 |
| 3,663,793 | 5/1972 | Petro et al. | 219/121.69 |
| 3,739,038 | 6/1973 | Landsman. | |
| 4,010,320 | 3/1977 | Kudlich | 358/297 |
| 4,156,124 | 5/1979 | Macken et al.. | |
| 4,422,101 | 12/1983 | Takei | 358/299 |
| 4,500,929 | 2/1985 | Buechler | 358/299 |
| 4,629,858 | 12/1986 | Kyle. | |
| 4,734,558 | 3/1988 | Nakano et al.. | |
| 4,744,936 | 5/1988 | Bittner Jr. | 264/175 |
| 4,843,207 | 6/1989 | Urbanek et al. | 219/121.68 |
| 4,859,828 | 8/1989 | Zumstein | 219/121.67 |
| 4,947,022 | 8/1990 | Ostroff et al. | 219/121.68 |
| 4,977,512 | 12/1990 | Nakagawa. | |
| 5,003,153 | 3/1991 | Kondo | 219/121.68 |
| 5,041,716 | 8/1991 | Wakabayashi | 219/121.68 |
| 5,269,983 | 12/1993 | Schulz | 264/400 |
| 5,338,915 | 8/1994 | Hildebrand et al. | 219/121.69 |

FOREIGN PATENT DOCUMENTS

| | | | |
|---|---|---|---|
| 3613013 | 10/1987 | Germany | 219/121.68 |
| 38347883 | 4/1990 | Germany. | |
| 40 39 132 A 1 | 6/1991 | Germany. | |
| 40 41 105 A1 | 6/1992 | Germany. | |
| 42 13 106 A1 | 11/1992 | Germany. | |
| 58-151983 | 9/1983 | Japan | 219/121.8 |
| 1-95885 | 4/1989 | Japan | 219/121.69 |
| P5-32100 | 2/1993 | Japan. | |

*Primary Examiner*—Gregory L. Mills
*Attorney, Agent, or Firm*—Olson & Hierl, Ltd.

[57] ABSTRACT

For the engraving of a pattern into the surface of a work piece by a laser beam which is directed onto the surface and controlled in its intensity in a location-dependent manner in dependence on the pattern, one surface area of a design pattern is, first of all, scanned optically or mechanically, and the surface information which is thus obtained is converted into electrical control signals. The laser beam is, by these control signals, controlled in a surface area which corresponds to the surface area of the design pattern. Different patterns can be engraved rapidly and easily by changing the design pattern. The scanning of the design pattern can be carried out finely and with high resolution, so that the engraving also has a correspondingly high resolution. The pattern of the design patterns can be as irregular as desired, so that complicated and irregular patterns can be engraved.

2 Claims, 1 Drawing Sheet

PROCESS FOR ENGRAVING A STRUCTURE INTO THE SURFACE OF A WORK PIECE WITH A LASER

BACKGROUND OF THE INVENTION

The invention relates to a process for engraving a pattern into the surface of a work piece.

A device and a process for contact-free engraving by means of a laser is known from the patent document U.S. Pat. No. 4,156,124. A laser beam is, by means of a mask apparatus, directed onto the surface of a work piece. The said mask may be either transparent or reflective. The laser beam is transmitted by means of an optical device, and the image of the mask is thus cast onto the surface of the work piece. The mask and the work piece are held in parallel to one another at a fixed distance and position. The source of the laser beam is moved relative to the mask and the work piece surface, so that the laser beam migrates over the mask and, as a result, the surface of the work piece. By means of the mask, the intensity of the laser beam is changed in a manner which is dependent upon location and, consequently, the effect of the laser beam on the surface into which the pattern thus presented through the mask is engraved, as well. Only simple and rough patterns can be engraved by means of such a process and such an apparatus. In addition, the production of the masks is complicated and expensive. The masks are limited, so that only limited patterns can also only be engraved.

A device for the engraving of different types of letterings into a surface is known from the patent document U.S. Pat. No. 4,734,558. The ray coming from the laser is expanded to a parallel beam, which proceeds through a mask which can be controlled in a manner specific for location, and which mask acts as a screen, and corresponds to the lettering which is to be engraved. The image of the mask is cast onto the surface which is to be engraved. The mask is a light valve in the form of a liquid crystal, the permeability of which is controlled, in a manner dependent on location, by an image which is cast by the screen of a cathode ray tube onto the liquid crystal. The image on the cathode ray tube, which corresponds to the character which is to be engraved, is supplied by a microcomputer. Several stored memories to be engraved, which can be selected by means of switches which can be activated by hand, are stored in the memory in this microcomputer.

In this known device, therefore, metallic masks are replaced by an optical mask which is controlled by means of a mask generator. The characters which are to be engraved are of a simple nature, and must first be stored in memory in the mask generator by means of a special program.

A process which is essentially similar to the type which has just been described, in which the mask is likewise variable, is already known from the patent document DE 42 13 106 A1. The variation is brought about by means of a different digital control. The engraving is carried out in successive layers, one after the other. The numerical control of the mask permits only simple mask images, and thereby simple engraving patterns as well. The numerical control is brought about, for example, by means of one or several rotating aperture disks, the aperture images of which come to cover a specific configuration. The patterns are thus always regular. Small image elements are thus assembled into larger image fields in which, because of their regularity, they make a seamless transition into one another. Irregular patterns, such an assembly of image elements into larger image fields, is not possible without the appearance of visible boundary lines.

A process is the type which is stated in the introductory portion of claim 1 is known from the patent document U.S. Pat. No. 4,629,858, in which a pattern on a sheet of paper is scanned by line by line and the intensity of a laser is controlled by the scanned signal, and is, in the same manner, directed line by line over a work piece in the shape of a carpet, so that a deep pattern which corresponds to the pattern of color on the paper pattern is burned into the surface of the same. The design pattern thereby has a size which corresponds to the size of the work piece. The processing of a work piece which has a surface which is larger than that of the design pattern is thus not possible.

A process is known, from the patent document U.S. Pat. No. 3,739,088, which operates in accordance with the same principle as the process which has been stated above, and which is used for the production of printing plates. Here, too, the surface of the design pattern obviously corresponds to the surface of the printing plate which is to be produced.

The task which forms the basis of the invention is that of describing a process of the type for engraving a structure into the surface of a work piece by means of a laser beam which is directed onto the surface and controlled in its intensity in a location-dependent manner in dependence on the structure, which can be carried out in a simple manner and is also suitable for complicated and, in particular, irregular patterns and by means of which a surface on the work piece, which is larger than that of the design pattern, can be engraved.

The task which forms the basis of the invention is solved by means of the concept of storing depth contour information which is obtained from the surface sample in memory and the depth contour information which is stored in memory is recalled at least two times and at least two surface areas which adjoin one another on a boundary line are thereby engraved on the work piece.

The basic concept of the theory in accordance with the invention consists of the fact that the surface information which is obtained from the design pattern is stored in memory and is recalled at least two times, and at least two surface areas on the work piece which adjoin one another on a boundary line are thereby engraved. The surface area on the work piece which is scanned by the design pattern can thereby be doubled or multiplied as desired. It is thus not in one direction only that several patterns, which each correspond to the surface area which is being scanned, engage into one another in series, but also in two directions, so that the total surface which is engraved is correspondingly enlarged. If the pattern which has been scanned in the surface area of the design pattern is simple and/or if the boundaries of the surface area are selected favorably, then a boundary line does not appear between two surface areas which adjoin one another on the work piece. If the patterns do not insert into one another without a transition and in an invisible manner at a boundary line between two surface areas which adjoin one another, then, in accordance with one suitable further development of the invention, it is advantageous if the surface information which is stored in memory is, upon the second recall, read backwards and, if applicable, during further recalls, it is read alternately forward and backwards, in such a manner that, during the engraving, a mirroring of the sample is carried out at the boundary line or the boundary lines.

In all cases in which the surface information corresponding to the surface area of a design pattern is recalled at least two times, it is suitable for the surface information to be processed into the information areas which are adjacent to the boundary line or to the boundary lines between the surface areas on the work piece, in such a manner that a transition which is continuous and as invisible as possible for the human eye, is produced in the area of the boundary line. This processing can essentially be carried out in any manner, such as, for example, controlled by an operating person under visual control, which can be simply a handicraft process. One particularly suitable form of implementation of the processing consists of the fact, however, that the surface areas which correspond to the scanning surface area of the design pattern on the work piece are, by means of a corresponding recall of the surface information, preferably overlapping in time, which is stored in memory, brought to overlap on the boundary line or on the boundary lines, and that, the control signals in this area of overlap are continuously reciprocally lowered or raised, in such a manner that an essentially continuous and invisible transition of the pattern is formed over the boundary line. This means, in other words, that a cross-fading of the patterns is brought about in the area of the boundary line or of the boundary lines.

One other manner of implementation of the process, in accordance with the invention, for obtaining an invisible transition between adjacent engraved surface areas on the work piece in a manner which is similar to the form of implementation which has been stated above consists of the fact that the control signals for the laser beam are continuously attenuated or increased again in a transition area, adjoining with the boundary line, on both sides of the boundary line, whereby transition control signals are added to the control signals in the transition area, which are derived from the surface of the information of the design pattern, and then reversed as the control signals in the transition area are continuously raised and lowered again, in such a manner that an essentially continuous, invisible transition of the pattern is formed over the boundary line.

A natural pattern, particularly the grain of a natural leather pattern, can suitably be used as the design pattern. The work piece may be an embossing roller, particularly one for the continuous embossing of a sheet of thermoplastic foil. The forms of the process, which bring about a boundary-free transition of the pattern on a boundary line can, with particular advantage, be used for this process. An embossing pattern which is continuous over the circumference of the embossing pattern can thus be produced. If the embossing is supposed to take place in dependence on a natural design pattern, such as, for example, the grain pattern of a natural leather pattern, then the embossing surface must be a negative of the natural design pattern. In order to attain this, it is suitable, in accordance with one form of implementation of this further embodiment of the invention, to invert the control signals for the laser beam.

BRIEF DESCRIPTION OF THE DRAWING

The process in accordance with the invention will now be illustrated in further detail by means of the diagrams.

DETAILED DESCRIPTION OF THE PRESENT INVENTION

Figure 1:
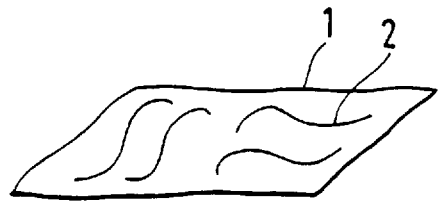
FIG. 1 Schematically depicts one design pattern.

A design pattern (1), which consists of natural leather and the surface of which has a natural grain pattern (2), which is indicated schematically, is depicted in FIG. 1.

Figure 2:
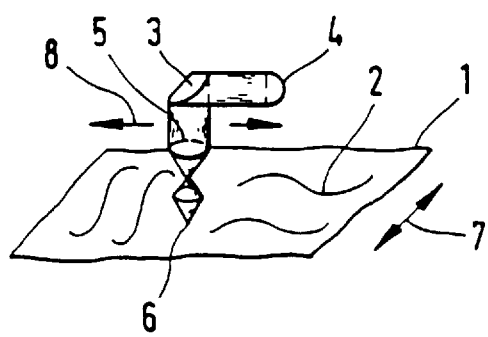
FIG. 2 Serves for the illustration of the scanning of the design pattern in accordance with FIG. 1.

FIG. 2 clarifies the scanning of the grain pattern (2) of the design pattern (1) in accordance with FIG. 1 through a focus position measuring system (3), which is generally known from the area of distance measuring technology. The focus position measuring system (3) has a laser (4), the beam of which is focused, by means of an optical system (5), onto the surface of the design pattern (1), at a single point (6).

The design pattern (1) is moved in the direction of an arrow (7), and the focus position measuring system (3) is moved in the direction of the arrow (8), in such a manner that the point (6) migrates, in a line-shaped manner, over the surface of the design pattern (1), and thus scans the grain pattern (2). The focus position measuring system (3) thereby continuously emits electrical control signals, which can be immediately used for controlling the intensity of a laser beam. The control of the laser beam can be carried out in any manner, such as, for example, in accordance with the process which has already been described in regard to the state of the art.

Figure 3:
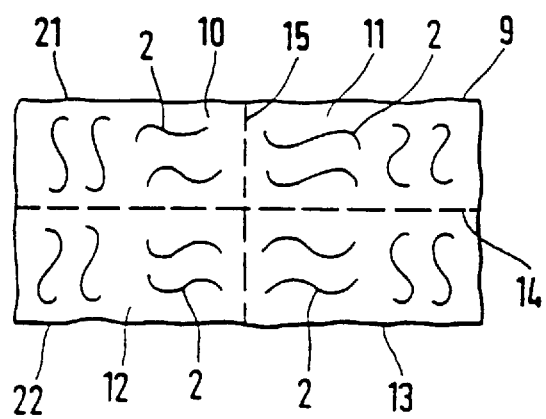
FIG. 3 Clarifies the engraving of a surface with surface information which is repeatedly recalled.

FIG. 3 schematically depicts an engraving image on the surface of a work piece (9). It is to be discerned that the surface information which arises from the grain pattern (2) is repeatedly impressed into the surface of the work piece (9), in such a manner that the patterns which are formed by the grain pattern (2) are mirrored on boundary lines (14 and 15), which are indicated here by means of dotted lines.

It can not be depicted in FIG. 3, and it is therefore explained here, that the control signals which are used in the engraving, and which have been repeatedly recalled, have been processed in such a manner that a transition which is continuous and, for the human eye, as invisible as possible, is produced in the area of the boundary lines (14 and 15). For this purpose, the control signals overlap, and are continuously reciprocally reduced or raised here, so that the grain pattern makes a transition from the one side, for example, of the boundary line (14), continuously and at the same engraving depth into the grain pattern on the other side of the boundary line (14).

Figure 4:
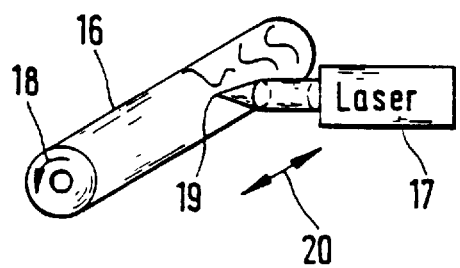
FIG. 4 Schematically clarifies the engraving of the surface of an embossing roller.

FIG. 4 depicts a roller (16), in the surface of which a pattern is engraved by means of a laser (17), in a manner which corresponds to the representation in FIG. 3. The roller (16) is, during the engraving, continuously turned in the direction of an arrow (18), while the laser (17), with its focus (19), slowly moves forward in the axial direction and in the direction of the arrow (20).

In this endless engraving, a further boundary line is brought about between the edges (21 and 22) of the representation in FIG. 3. At this boundary line, the control signals are, in the same manner as at the boundary line (14), reciprocally and continuously dropped or raised again, so that a transition of the grain pattern which is continuous and, for the human eye, as invisible as possible, is produced over the boundary line.

Figure 5:
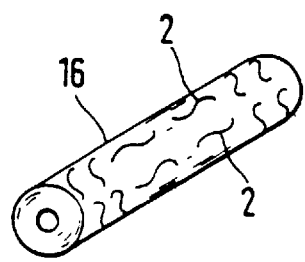
FIG. 5 Schematically depicts the engraved embossing roller.

FIG. 5 schematically represents the final engraved roller (16).

We claim:

1. A process for engraving a structure into a surface of a work piece by means of a laser beam which is directed onto the surface and controlled in its intensity in a location-dependent manner in dependence on the structure;

in which the depth contour of one surface area of surface sample is optically or mechanically scanned, thus obtaining depth contour information, and the depth contour information which is thus obtained is converted into electrical control signals;

which control the intensity of the laser beam in a surface area of the work piece:

characterized in that:
- storing the depth contour information which is obtained from the surface sample in memory;
- the depth contour information which is stored in memory is recalled at least two times and at least two surface areas which adjoin one another on a boundary line are thereby engraved on the work piece,
- the surface information which has been recalled at least two times is processed in information areas which are adjacent to the boundary line between the surface areas on the work piece, in such a manner that a transition which is continuous and, essentially invisible to the human eye, is produced in an area of the boundary line, and,
- the surface areas which correspond to the scanned surface area of the surface sample are, by means of a corresponding recall of the stored surface information overlapping in time, brought to an overlap are continuously lowered or increased, in a reciprocal manner, in such a manner that an essentially continuous, invisible transition of the pattern across the boundary line is formed.

2. A process for engraving a structure into a surface of a work piece by means of a laser beam which is directed onto the surface and controlled in its intensity in a location-dependent manner in dependence on the structure;
- in which the depth contour of one surface area of surface sample is optically or mechanically scanned, thus obtaining depth contour information, and the depth contour information which is thus obtained is converted into electrical control signals; which control the intensity of the laser beam in a surface area of the work piece:

characterized in that:
- storing the depth contour information which is obtained from the surface sample in memory; and:
- the depth contour information which is stored in memory is recalled at least two times and at least two surface areas which adjoin one another on a boundary line are thereby engraved on the work piece,
- the surface information which has been recalled at least two times is processed in information areas which are adjacent to the boundary line between the surface areas on the work piece, in such a manner that a transition which is continuous and, essentially invisible to the human eye, is produced in an area of the boundary line,
- the control signals for the laser beam are, in one transition area adjoining the boundary line, continuously attenuated or raised from both sides to the boundary line; and
- that, transition control signals, which are derived from the depth contour information of the surface sample are added to the control signals in the transition area and are, in a reverse manner to the control signals in the transition area, continuously raised and reduced in such a way that an essentially continuous, invisible transition of the structure across the boundary line is formed.

* * * * *